Figure 1:
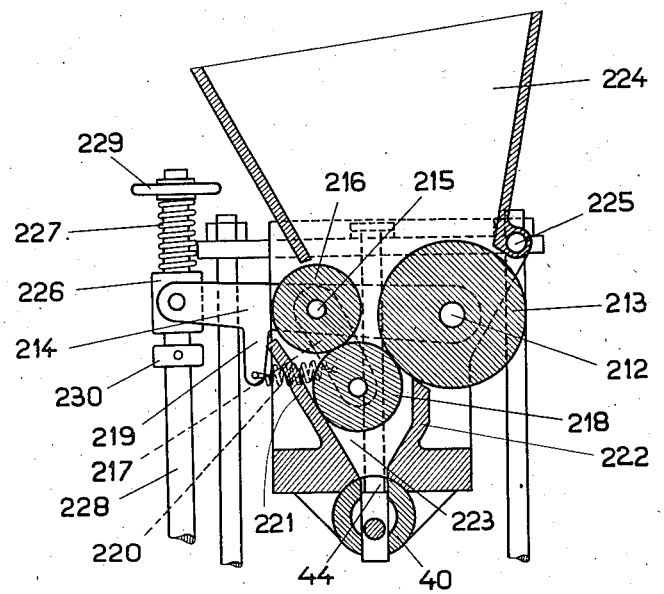

May 17, 1932.  O. KREMMLING  1,858,831
AUTOMATIC DOUGH DIVIDING AND WORKING MACHINE
Filed Oct. 6, 1927  4 Sheets-Sheet 1

Inventor:
Otto Kremmling
by
Etka, Kehlenbeck & Farley
Attorneys

Inventor:
Otto Kremmling
by Loka, Kehlenbeck & Farley
Attorneys.

May 17, 1932. O. KREMMLING 1,858,831
AUTOMATIC DOUGH DIVIDING AND WORKING MACHINE
Filed Oct. 6, 1927 4 Sheets-Sheet 3

Inventor:
Otto Kremmling
by Looka, Kehlenbeck & Farley
Attorneys

May 17, 1932. O. KREMMLING 1,858,831
AUTOMATIC DOUGH DIVIDING AND WORKING MACHINE
Filed Oct. 6, 1927 4 Sheets-Sheet 4
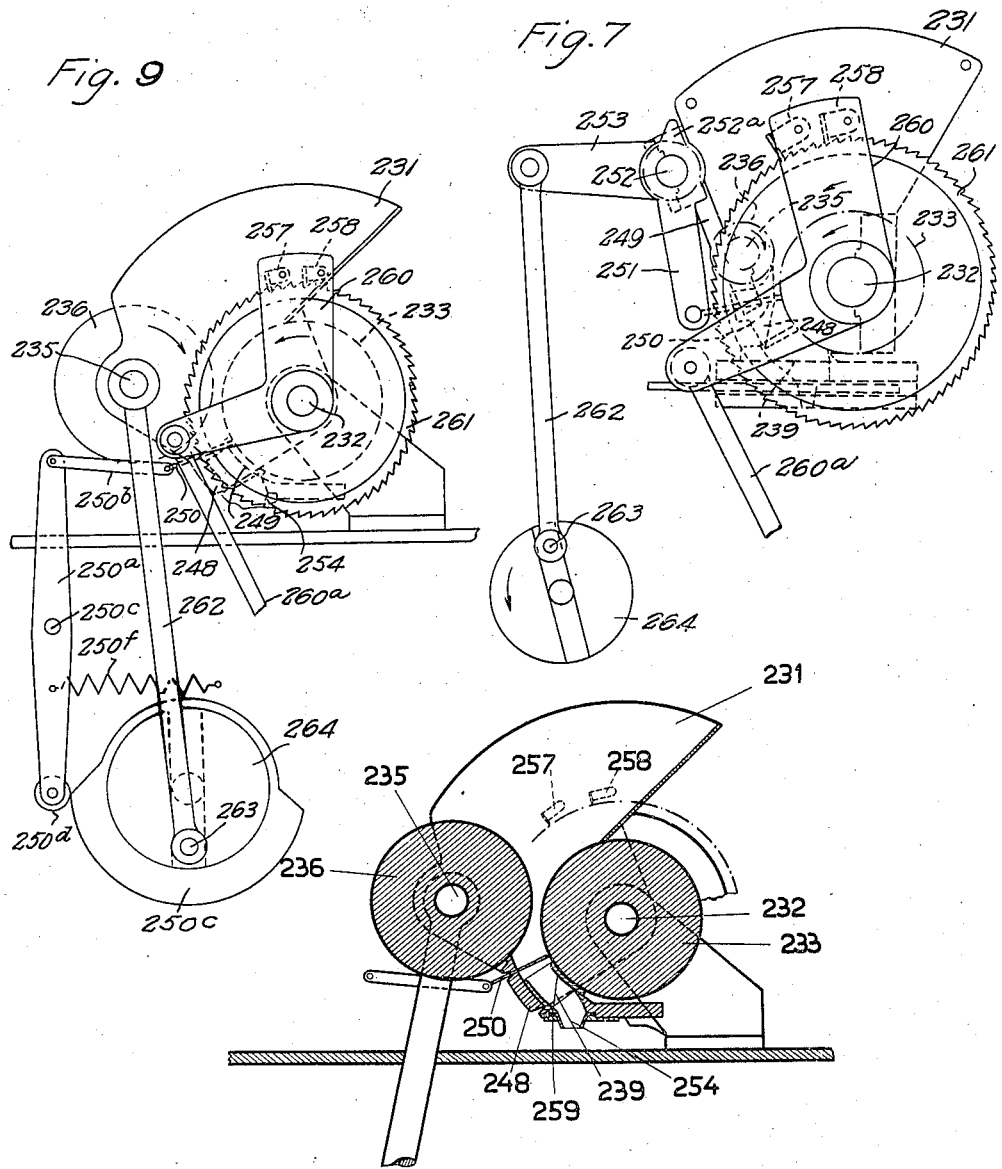
Inventor:
Otto Kremmling
by Lotka, Kehlenbeck & Farley
Attorneys.

Patented May 17, 1932

1,858,831

UNITED STATES PATENT OFFICE

OTTO KREMMLING, OF HAMERSLEBEN, NEAR OSCHERSLEBEN, GERMANY

AUTOMATIC DOUGH DIVIDING AND WORKING MACHINE

Application filed October 6, 1927, Serial No. 224,308, and in Germany October 26, 1926.

My invention relates to improvements in automatic dough dividing and working machines.

In my earlier Patent #1,782,006 of November 18, 1930, there has been described and claimed a machine for performing the dividing and working operations, and the object of the present invention is to provide simplified and efficient mechanism and apparatus which in some respects may be regarded simply as improvements over structures disclosed in said previous application.

In the said previous application the dough dividing apparatus is provided with a system of co-operating rollers for kneading and pressing a batch of dough and forcing the same into chambers from which individual lumps of dough are deposited, by means of suitable displacing members, in series onto a continuously running conveying belt, while the working device or apparatus moves along with the conveying belt during the working operation, but is caused to return, over the adjacent series of dough lumps, to its initial position when the working operation has been finished.

Figures 10 to 13 of the said previous application illustrate means and arrangements for keeping the pressure balancing chamber located between the dough container or hopper and the dividing members, closed against or relative to the dough container during the dividing operation.

The object of my present invention is to improve the said means and arrangements for shutting up the pressure balancing chamber, in such a manner that the body of dough contained in the dough hopper and between the feeding rollers, cannot be affected by the movements imparted to the batch of dough in the said chamber at the extruding operation, which is of great importance, particularly as regards dough of sensitive character.

With the above recited object in view, reference is had to the following specification and drawings in which there are exhibited a few examples or embodiments of the invention which in no way are intended as a limitation upon the scope of the appended claims as it is to be clearly understood that variations and modifications which fairly fall within the true scope of said claims may be resorted to where found expedient.

Figure 2:
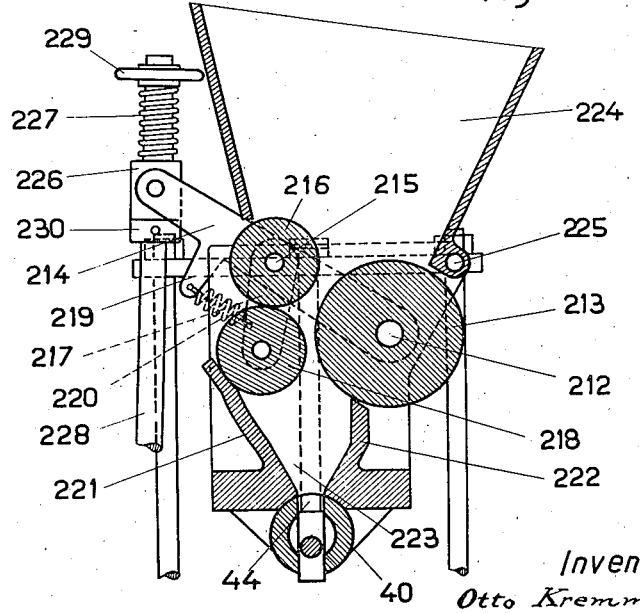
Figure 3:
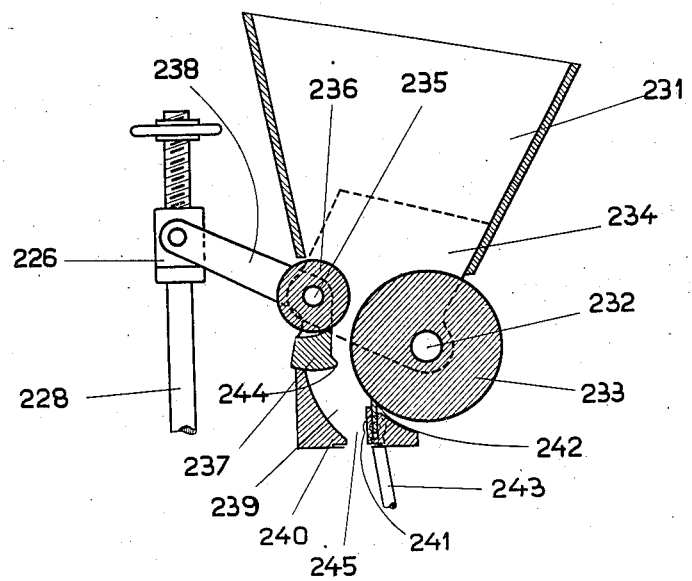
Figure 4:
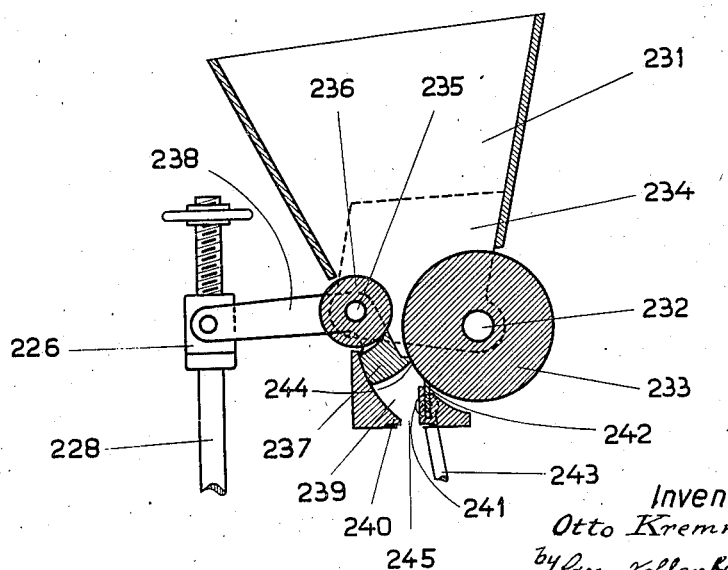
Figure 5:
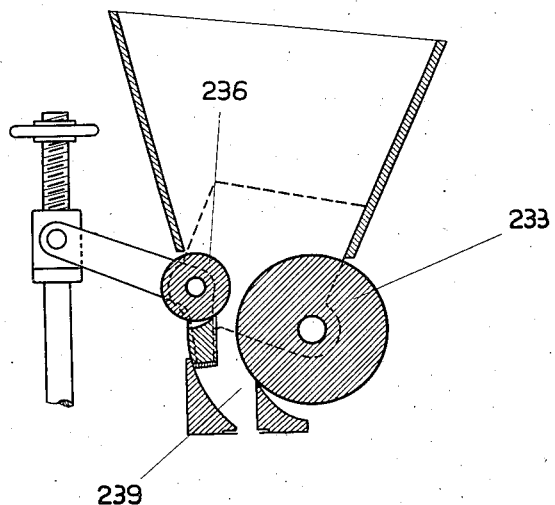
Figure 6:
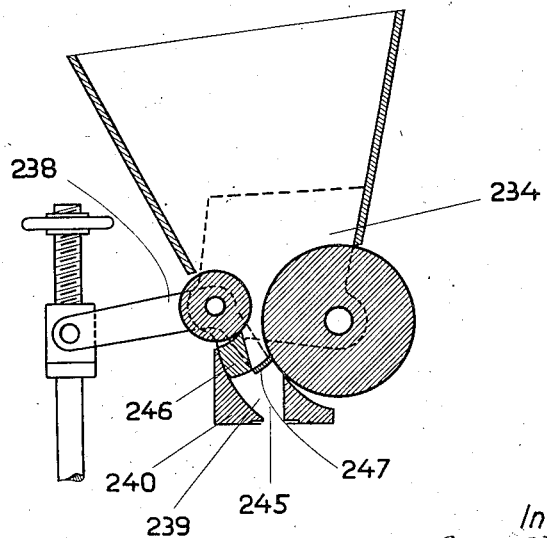

In the accompanying drawings forming a part of this specification and wherein like characters designate like parts in those figures which illustrate one and the same embodiment of the invention:

Figure 1 is a view in vertical section of an apparatus embodying the present improvements, Figure 2 is a similar view of the same with the movable parts in the other working position, Figures 3 and 4 are similar views showing a modified construction of the apparatus in the two working positions, Figures 5 and 6 are like views illustrating a further modification of the same in the two working positions, Fig. 7 is a side elevation showing still another form of the invention; Fig. 8 is a sectional view of a further form with the parts in the positions occupied at the end of the extruding operation, and Fig. 9 is a side elevation of the apparatus shown in Fig. 8.

Referring to the embodiment shown in Figures 1 and 2, two levers 214 are loosely mounted on the two trunnions 212 of the large roller 213 journaled in stationary bearings and the upper small roller 216 is supported with its trunnions 215 in bearings provided in the two levers 214. The lower small roller 218 is suspended from the roller 216 by means of two links 217 pivotally connected with the trunnions 215 of the roller 216 and with the trunnions of the roller 218, as will be clearly seen in Figures 1 and 2, although a single link 217 only is shown for clearness' sake. A nose or projection 219 of the lever 214 is connected with the link 217 by means of a coiled spring 220 tending to constantly hold the roller 218 in contact with a wall 221 which co-operates with a wall 222 to constitute or laterally enclose the pressure balancing chamber 223. The feeding hopper 224 is mounted so as to be capable of rocking about a pivot 225.

The outer end of the lever 214 is pivotally attached to a bushing or sleeve 226 mounted on a vertical rod 228 and adapted to slide on the rod under the pressure of an adjustable spring 227. The upper end of the rod is screw-threaded and a nut shaped to form a handle or similar formation 229 is fitted to the threaded end of the rod 228 for the purpose of adjustment. The sliding movement of the sleeve 226 on the rod in downward direction is limited by a collar or stop 230.

When the parts described are in the position shown in Figure 1, the small roller 218 acts to close the pressure balancing chamber 223 towards or against the feeding hopper 224, the roller 218 being held in firm contact with the wall 221 and the large roller 213. When the parts move from the feeding position shown in Figure 2 to the position illustrated in Figure 1, the batch of dough contained in the chamber 223 is partially driven out from the chamber into the cups or pockets 44 of the cylinder 40. The part the roller 218, which constitutes a member independent of the feed rollers 213 and 216, takes in its downward movement is controlled by or depends upon the shape of the wall 221 with which the roller 218 is permanently held in contact by the spring 220.

In the construction shown in Figures 1 and 2 the large roller 213 forms a part of the one wall of the chamber 223. In order to reduce frictional injury to the dough, in the modifications illustrated in Figures 3 to 8 the corresponding wall of the pressure balancing chamber is almost entirely formed by the large roller so that friction between the dough and stationary immovable parts will be still further reduced, it being evident that the dough is prevented thereby from undergoing any unsuitable frictional treatment.

In the embodiment shown in Figures 3 and 4 the hopper 231 is pivoted to the shaft or trunnions 232 of the large feeding roller 233 and a small roller 236 is mounted on a shaft 235 supported in suitable bearings in the end walls 234 of the hopper 231. The two rollers co-operate in the same manner and for the same purpose as the corresponding rollers of the embodiment shown in Figures 1 and 2, but in substitution for the third roller in Figures 1 and 2 a head or plunger 237 is provided in the embodiment illustrated in Figures 3 and 4, the said plunger 237 being rigidly connected or integral with the one arm of a bell-crank lever 238 fulcrumed to the shaft 235. The other arm of the lever 238 is pivotally attached to the bushing or sleeve 226 mounted on the pull-rod 228 in the same manner as hereinbefore described with reference to Figures 1 and 2.

The pressure balancing chamber 239 is confined on the one side by a stationary wall 240 and on the opposite side mainly by the cylindrical surface of the large roller 233 forming the major upper portion of the wall whilst the minor lower portion or section thereof is formed by a low wall member 241 provided with a vertical slide 242 adapted to be operated in a vertical plane by a rod 243 for closing the air gap or channel between the wall member 241 and the large roller 233. The inner surface of the wall 240 is curved cylindrically and in parallelism to the working surface of the large roller 233 and the surface of the head or plunger 237 contiguous to the curved surface of the wall 240 is of the same curvature.

As regards the operation of the apparatus, the plunger 237 moves down, during the compression stroke or operation from the position shown in Figure 3 to the position illustrated in Figure 4, that is along and in contact with the curved surface of the wall 240 and with its edge 244 in touch with the peripheral surface of the large roller 233 so as to occupy and close the whole of the sectional area of the chamber 239 but without sliding with its edge 244 on the surface of the roller 233. Consequently any friction detrimental to the dough is avoided at this place.

On the return stroke or travel of the plunger 237 from the position illustrated in Figure 4 to that shown in Figure 3 the dough in the vicinity of the extruding openings 245 would be liable to return into the chamber 239 due to suction, but for the slide 242 which is connected with the rod 243 operated by a shaft of the machine (not shown) in such a manner that the slide 242 will become disengaged from the roller 233 when the plunger commences to return from its lowermost position to the position shown in Figure 3, so that the air gap or channel between the wall member 241 and the large roller 233 will be free and open to allow air to enter the chamber 239.

The embodiment shown in Figures 5 and 6 differ from the construction just described only in that the head or plunger comprises two parts 246 and 247 which together constitute a member independent of the feed rollers. The main body 246 of the plunger is rigidly connected with the end walls 234 of the hopper and the part 247 of the same is firmly attached to or integral with the depending arm of the bell-crank lever 238. In this modification the slide 242 and its operating means are entirely dispensed with since the dough in the opening 245 is not liable to be sucked in at the return movement of the plunger. As will be seen in Figure 6, the dough is extruded from the chamber 239 by the joint action of the two parts 246 and 247 of the plunger spread or extended laterally to occupy the whole width of the chamber 239, and it will be understood that when the extruding operation is terminated and the plunger commences to return to the position shown in Figure 5, the two parts of the plunger again overlap fully so that a sucking action cannot prevail in the chamber as full communication between the chamber and the hopper for supplying a fresh lump of dough to the former will be gradually established thereby. During the return movement of the bipartite plunger from the position shown in Figure 6 to that in Figure 5 the then revolving rollers 233 and 236 act to supply dough to the chamber 239 so that no cavity or void can form in the dough body under treatment.

In the form shown in Fig. 7, the hopper 231 is pivotally mounted upon the shaft or trunnions 232 of the feeding roller 233 which is located in co-operative relation to the feeding roller 236; the latter is mounted on the shaft 235 journalled in suitable bearings in the end walls of the hopper 231. The form now under discussion includes a bipartite plunger which consists of a plunger element 248 comprising part of the hopper 231 and a plate or slide 250 which is an independent element insofar as the rollers 233 and 236 are concerned and is arranged to be reciprocated in a slot formed in the element 248 in operative relation to the dough receiving chamber and its outlet. The means whereby the plate or slide 250 is reciprocated may, as shown in Fig. 7, comprise a bell-crank lever pivotally mounted at 252 on the hopper 231 and having its one member 251 connected with said slide 250 and its other member 253 connected with a link 262 pivotally secured at 263 to a pin adjustably mounted in a groove extending diametrically across a rotating disk 264 operated in any convenient manner. The rocking of the hopper 231 to cause the slide 250 to develop a dough extruding movement is also accomplished by means of the disk 264 and its associated elements, a projection 252ª being provided on the bell-crank lever 253—251 for engagement with said hopper 231 to effect the rocking thereof in a movement of recovery; the movement in the opposite direction is effected when the slide 250 engages the roller 233 as will be apparent.

The step by step operation of the roller 233, in the illustrated example, is accomplished by means of a bell-crank lever 260 movably mounted on the shaft or trunnions 232 and rocked thereon by means of a link 260ª connected with one arm of the lever 260 and with any conventional mechanism for bringing about the desired result. The other arm of the bell-crank lever 260 carries two pawls 257 and 258 adapted to engage the teeth of the ratchet wheel 261 mounted to rotate with the roller 233 and serving to rotate the latter to feed the dough to the chamber 239.

In the subsequent extruding operation the parts mounted pivotally on the shaft 232 of the feeding roller 233 swing downwards so that the two parts 248 and 250 constituting the plunger which is independent of the feed rollers 233 and 236 will act to extrude dough from the chamber 239. At the termination of the extruding operation the slide 250 is caused by the lever arm system 251, 252 and 253 to recede in the slot of the piston part 248 so that communication between the chamber 239 and the hopper 231 will be at once established for the supply of a fresh batch of dough to the chamber. Consequently in this modification also the free space produced in the chamber 239 by the return movement of the plunger part 248 will be filled with dough immediately so that no cavity or void can form in the mass of dough under treatment. At the beginning of the following extruding stroke the slide 250 will again be brought in contact with the peripheral surface of the roller 233 so as to act as a closing and propelling means between the parallelized walls of the chamber 239.

A particular advantage of the embodiments shown in Figures 5 to 7 resides in that upon the receding movement of the part 247 or 250, respectively, of the plunger the dough present below the receding plunger part will be taken along with the roller 233 so that the batch or mass of dough to be newly supplied by the roller to the pressure balancing chamber will be introduced thereinto without encountering any resistance or prejudicial friction. Obviously the parts that are caused to rock for the extruding purpose, may be arranged inversely that is to say in such a manner that the base structure including the wall 240 which in the embodiment shown is stationary will be movable whilst the extruding plunger is stationary so that the said base structure forming the chamber 239 will be caused to perform the movements required for the extruding purpose, by rocking about the shaft 232 of the large roller 233 so as to move towards the stationary plunger and the other members of the upper structure.

A further advantage of the embodiments illustrated in the Figures 5 to 7 resides in that open extruding nozzles 254 may be substituted for the dividing cylinder 40 and the parts co-operating therewith shown in Figures 1 and 2, since the dough extruded from the chamber 239 into the discharging openings will not be retracted or caused by the plunger to return and consequently constantly uniform lengths of dough will be extruded which may be divided by means of any usual severing device.

The same advantages are inherent to the construction of the apparatus shown in Figure 8 which, however, in addition to that is adapted to extrude while the feeding roller 233 is rotating continuously, a wide, compact unitary dough tape, provided that an extruding slit is substituted for the nozzles 254. In this construction the revolving feeding roller 233 is equipped with slides 255 adapted to slide in suitable radial guide-ways and to successively project therefrom in order to cut off or separate a batch of dough from the dough body contained in the stationary hopper 231, move the said batch of dough, in co-operation with the smooth roller 236, down into and through the chamber 239 and then return or recede into the guide-ways of the roller 233 so as to not project therefrom, as will be clearly seen on inspection of the cam slot 256 and the different positions of the slides 255 shown in Figure 8. Thus the slides 255 are controlled by the cam slot 256 to act as extruding pistons on their way through the chamber 239, whilst the free ends or extremities thereof are caused to lie flush with the surface of the roller 233 in the idle portion of their travel. It will be evident that the driving mechanism may be arranged to act at an adjustable yielding pressure, either continuously or intermittently as in the other embodiments described herein.

Reverting to the embodiment illustrated in Figure 7 the hopper 231 is provided with two pawls 257 and 258 adapted to engage with a ratchet wheel 232'—indicated in dot-and-dash line—mounted on the shaft 232 of the roller 233 to form, in co-operation with the said pawls, a ratchet-gear. The pawls 257 and 258 are arranged to cause the feeding rollers to partake in the rocking movements of the upper structure of the apparatus in one direction only, that is to say, during the extruding operation, in order to thereby prevent relative motion between the rollers and the dividing or extruding members of the apparatus. This mode of construction also assists in preventing the formation of cavities or voids in the dough and ensuring uniformity in the dividing operations even if the dividing cylinder 40 is dispensed with. While a single pawl would be operative, the provision of a plurality of pawls so spaced as to engage alternately in the spaces between adjacent teeth of the ratchet wheel affords the advantage of accurate and rapid engagement.

In the construction shown in Figs. 9 and 10, the hopper 231 is pivoted upon the shaft or trunnions 232 of the feeding roller 233 in the same way as in Fig. 7, the feeding roller 233 being similarly located in co-operative relation to the roller 236 which is mounted on a shaft 235 journalled in suitable bearings in the end walls of the hopper 231, as in Fig. 7. In the form now being described a bipartite plunger is included as in Fig. 7 and comprises a plunger element 248 comprising part of the hopper 231 and a plate or slide 250 arranged to be reciprocated in a slot formed in the element 248 in a manner set forth more fully hereinafter. The element 248 of Fig. 9 slides over the exterior 259 of the chamber 239 so that the dough will be pressed through this chamber and the nozzles 254 leading therefrom, as the apparatus is operated. The step by step operation of the roller 233 may be accomplished in any suitable manner as by means of a bell-crank lever 260 movably mounted on the shaft or trunnions 232 and rocked thereon by means of a link 260ª connected with one arm of the lever 260 and with any conventional mechanism for bringing about the desired result. The other arm of the bell-crank lever 260 is provided with two pawls 257 and 258 adapted to engage with a ratchet wheel 261 mounted to rotate with the roller 233, the arrangement of the pawls 257 and 258, with respect to the teeth of the ratchet wheel 261, being the same as that set forth with respect to Fig. 7. For the purpose of oscillating the hopper 231 on the shaft or trunnions 232, a link 262 is connected at 235 with said hopper 231 and at 263 with a pin adjustably mounted in a groove extending diametrically across a rotating disk 264 operated in any suitable manner.

In the operation of the apparatus shown in Figs. 9 and 10 the feeding roller 233 will be operated by the pawls 257 and 258, and the ratchet wheel 261 to convey a batch of dough from the hopper to the chamber 239 and the hopper 231 with the roller 236 and slide 250, the latter being in the position shown in Fig. 9, will be oscillated by the link 262 and disk 264 to extrude the dough through the nozzles 254. At the termination of the extruding operation the slide or plate 250 will be receded in the slot of the element 248 to again establish communication between the chamber 239 and the hopper 231. At the same time the hopper 231 will be shifted back to its normal position, it being understood that the rollers 233 and 235 operate to supply dough to the chamber 239 during the aforesaid return movement of the hopper 231.

The previously mentioned slide 250, in the illustrated example is reciprocated by means of an arm 250ª with the one end of which the slide 250 is connected through the medium of a link 250ᵇ. The arm 250ª is pivoted at 250ᶜ on a suitable stationary part of the machine and at its other end carries a roller 250ᵈ held in rolling engagement with a suitable cam 250ᵉ by means of a spring 250ᶠ. The cam 250ᵉ is mounted to rotate with the disk 264 and is concurrently operated therewith.

The main advantage of the apparatus constructed according to my invention lies in the gentle treatment with which the dough meets during the dividing process and particularly in the extruding operation, because frictional action on the dough is minimized and formation of cavities or voids in the dough is avoided in the pressure balancing chamber. Owing to this fact the quality and density of the dough is always very uniform and the dividing operation is performed in a uniform manner to ensure uniform portions of dough.

A plurality of dividing cylinders of the character described above, equipped with extruding plungers or with open extruding nozzles, may be arranged and located in a series close by each other so that detrimental frictional faces are minimized and the output of the apparatus is increased or, with the same output the machine may be run at a lower speed so that the dividing operation is rendered more reliable and uniform. In this case the extruded portions or lumps are severed from the batch by two blades or cutters located immediately below the plungers or nozzles and adapted to co-operate for the severing operation, and the cut-off lumps are deposited on the traveling or conveying belt, the two blades spaced for the width of a nozzle acting to deposit the half of the cut-off dough portions or lumps to the one side and the other half thereof to the other side. Thus the lumps drop in two series and with the required "oven"-distance onto the conveying belt although the extruding openings are located in a series close to each other. In this way I reduce the dimensions of the dough friction faces to almost one half so that the dough is dealt with in a particularly careful and gentle way.

I have not attempted to explain all of the minute details of the construction of the apparatus, for it will be understood by those to whom this specification is addressed that the parts will necessarily be of the proper size and relationship and will be properly mounted in accordance with the tenets of machine construction. It will be evident that, as hereinbefore intimated, my invention whilst still being adhered to in its main essentials, may be varied and adapted in many ways, according to the requirements desired or most suitable under different circumstances.

What I claim is:

1. A feeding mechanism of the character described, comprising a main feed roller, an auxiliary feed roller co-operating therewith, a chamber adapted to receive material fed by said rollers, said chamber having a guide wall concentric with the main feed roller, and an outlet, a member arranged to reciprocate circumferentially of said main feed roller, along said guide wall, and a slide arranged to move with said member and also to reciprocate thereon transversely into and out of engagement with the main feed roller.

2. A feeding mechanism of the character described, comprising a chamber provided with an outlet, a feed device arranged to deliver material to said chamber and including a feed roller, a hopper mounted to oscillate about the axis of said roller and to deliver material to said feed device, mechanism for causing said roller to be given a partial rotation by the hopper as the latter swings in one direction, and an extruding device, interposed between said roller and the outlet of said chamber, and operated by the oscillation of said hopper.

3. A feeding mechanism of the character described, comprising a chamber provided with an outlet, a feed device arranged to deliver material to said chamber and including a feed roller and an auxiliary roller co-operating therewith, a hopper mounted to oscillate about the axis of said feed roller and carrying said auxiliary roller, and adapted to deliver material to said feed device, mechanism for causing said feed roller to be given a partial rotation by the hopper as the latter swings in one direction, and an extruding device, interposed between said rollers and the outlet of said chamber, and operated by the oscillation of said hopper.

4. A feeding mechanism according to claim 2, in which the hopper and the feed roller are provided, one with a set of ratchet teeth and the other with a plurality of pawls adapted to co-operate with said teeth and so spaced as to secure a successive entry of said pawls into the spaces between said teeth.

5. A dough feeding mechanism for dough dividing the work machines, comprising a pressure-balancing chamber having an outlet at its lower portion, a main feed roller in operative relation to said chamber, a hopper mounted for pivotal movement relatively to said main roller, a second feed roller co-operating with said main roller to feed dough from said hopper to said chamber, and a device carried by said hopper and partaking of the pivotal movements thereof, said device being adjustable into contact with said main roller to close the communication between said hopper and chamber and to extrude dough from said chamber as said hopper is pivotally moved in one direction.

6. A feeding mechanism of the kind described, comprising a main feed roller, a hopper pivotally mounted on the axis of said main roller, an auxiliary feed roller spaced from said main feed roller, and partaking of the pivotal movement of said hopper, a chamber adapted to receive material fed by said rollers from said hopper, said chamber having a guide wall and an outlet, and a cut-off member partaking of the pivotal movements of said hopper and movable thereby along said guide wall to close the communication between said hopper and chamber and to extrude material through said outlet.

7. A feeding mechanism as set forth in claim 6, in which the cut-off member comprises a plunger carried at the end of a bell-crank lever pivotally mounted on said hopper and movable along said guide wall into contact with said main roller to close the communication between said hopper and chamber and to extrude material through said outlet as said hopper is pivotally actuated.

8. A feeding mechanism as set forth in claim 6, in which the cut-off member consists of two sections, one of which is mounted upon said hopper and movable along said guide wall, and the other of which is carried by a bell-crank lever pivotally mounted on said hopper and movable into contact with said main roller to close the communication between said hopper and chamber and to co-operate with said first section for extruding material through said outlet.

In testimony whereof, I have signed my name to this specification this twenty-sixth day of August, 1927.

OTTO KREMMLING.